INVENTORS.
William Mynard McConnell
George P. Whitfield

BY *Webb, Mackey & Burden*

THEIR ATTORNEYS

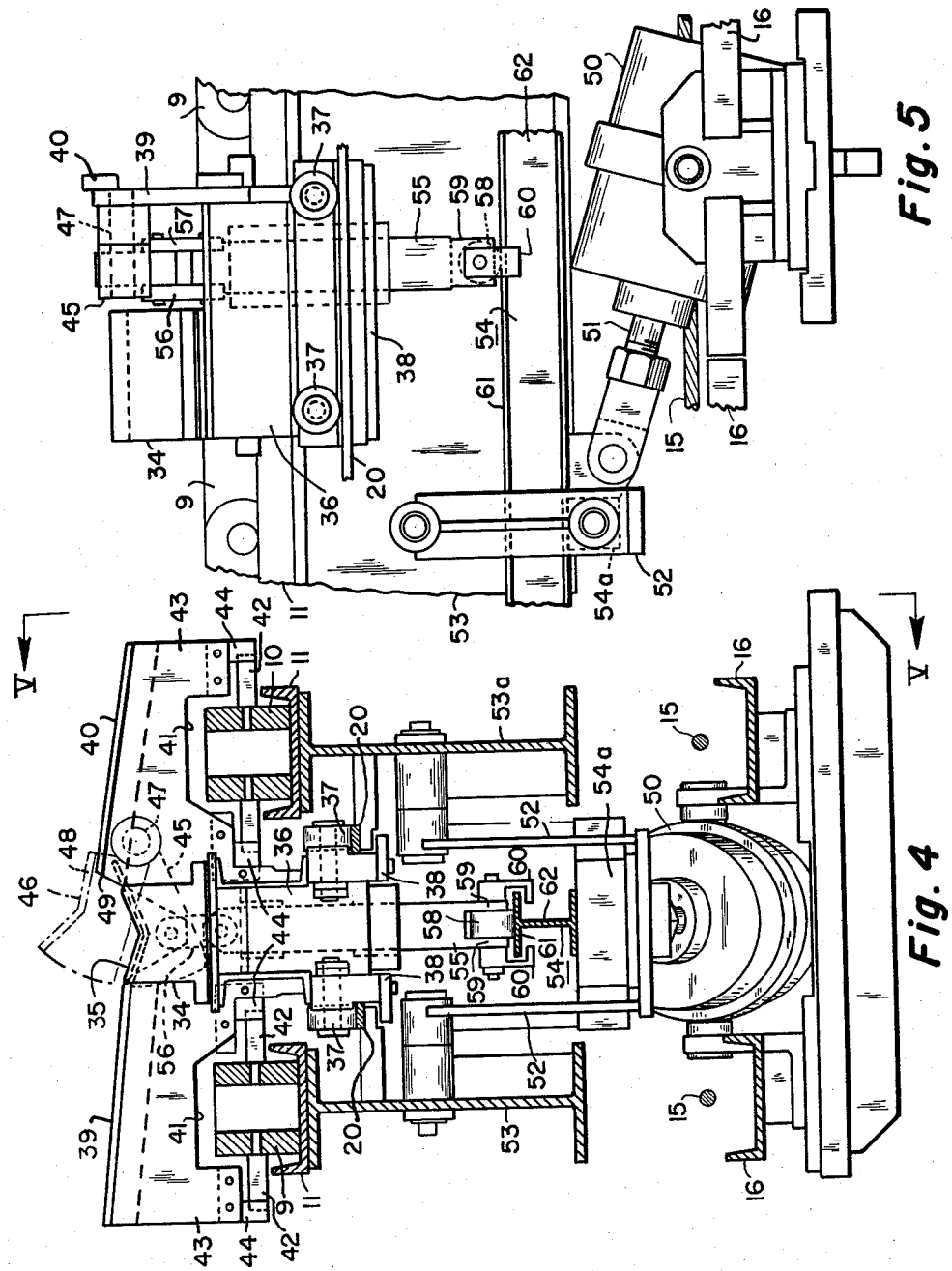

INVENTORS.
William Mynard McConnell
George P. Whitfield

BY Webb, Mackey & Burden

THEIR ATTORNEYS

United States Patent Office 3,137,159
Patented June 16, 1964

---

3,137,159
APPARATUS FOR HYDRAULICALLY PRESSURIZING PIPE

William Mynard McConnell and George P. Whitfield, Pittsburgh, Pa., assignors to Taylor-Wilson Manufacturing Co., Pittsburgh, Pa., a corporation of Pennsylvania
Filed Oct. 22, 1962, Ser. No. 232,103
11 Claims. (Cl. 73—49.1)

This invention relates to apparatus for hydraulically testing and/or expanding pipe, tube, and the like, wherein the ends of the pipe are sealingly engaged by two spaced apart heads and the pipe is supported intermediately its ends. At least one of the two heads is movable along a frame of the apparatus toward and away from the other to accommodate different lengths of pipe.

Heretofore, most pipe testers and expanders have included devices for use with the movable head to secure it in a given position along the frame for testing or expanding a particular length of pipe. The lock device has been a rack and pawl combination, a plurality of spaced apart holes in rails of the frame for receiving a lock pin, and the lock pin, etc. each of which has a pitch between successive teeth of the rack or holes in the rails. To assure that the end of each pipe opposite the movable head is sealed for the testing and/or expansion operation, the movable head has a set-out stroke at least as long as the pitch between the successive teeth or holes. Accordingly, unless successive pieces of pipe have substantially the exact same length, different amounts of the end portions of successive pipe are covered by the movable head for testing and/or expanding and in many instances an excessive part of the end portion of the pipe is covered. This amount which any end portion of pipe is covered is dependent upon where the pipe terminates between successive notches or holes of the lock device. Inasmuch as the pitch between successive teeth or holes has been at least 6" or more, the set-out stroke of the head has been more than 6" whereby 5" and more of end portions of pipe have been covered by the movable test head for testing and/or expansion.

That part of the end portion of the pipe which is sealed and covered by the head is not tested because it is subjected to internal and external pressures of the same magnitude. As a result, some specifications require that a certain minimum amount of end portion of pipe be cropped off and, in some instances, this amounts to as much as 6" or more. Thus, it is highly desirable to cover and seal only that amount of each end portion required to effect a watertight seal and to avoid covering and sealing excessive lengths of the end portions.

Most pipe test and expansion machines have a plurality of saddles or supports intermediate the two heads to engage and maintain the pipe in position for testing and expanding. In order to handle different lengths of pipe, at least some of these saddles travel along the frame when the movable head is shifted to a new position for a different length of pipe. Thus, to minimize cost of the apparatus and maintenance expenditures, a simple, reliable and rugged movable saddle arrangement has considerable merit.

To avoid subjecting the pipe to mechanical end loads as distinguished from hydraulic end loads during testing and expanding, many machines have a hydraulic lock connected to one of the heads to insure that the heads back off the ends of the pipe a small amount when the pipe is pressurized and to lock one of the heads in its set-out position. The amount of back-off is small, usually a fraction of an inch, and is insufficient to break the end seal with the pipe. Since these hydraulic locks have been connected directly to the heads, they have been large in order to withstand the test pressures and to prevent breakage of the end seals while the pipe is pressurized. Consequently, their use has been not only expensive, but also inconvenient due to their bulkiness so that ability to reduce their size has important advantages.

Our invention is apparatus for hydraulically pressurizing pipe not only eliminates the lock devices for the movable head, thereby permitting testing and expanding the maximum length of each pipe, but also provides a simple and rugged type saddle locating arrangement and effects use of substantially smaller hydraulic locks than heretofore for the same testing and expanding operations. Specifically, our invention relates to apparatus which has a frame and a first head for sealingly engaging one end of a pipe and comprises at chain disposed on the frame and extending longitudinally thereof for movement therealong. A second head for sealingly engaging the other end of the pipe is connected to the chain and is movable therewith toward and away from the first head. The chain is adapted to be drivingly connected to motor means for moving it along the frame to cause the second head to travel a path towards and away from the first head.

Intermediate the two heads are at least first and second saddles which have mountings for permitting travel upon the frame and which support the pipe between its ends. These mountings are such that engagement of one of the saddles by one of the second head and the other saddle upon travel of the second head towards the first one advances the saddle engaged thereby towards the first head.

A first means is connected to the fiirst saddle and positioned to engage a first saddle moving means joined to the chain when the chain moves along the frame to convey the second head away from the first head and to advance the first saddle away from the first head. Also, there is a second means connected to the second saddle and positioned to engage a second saddle moving means joined to the chain when the chain conveys the second head away from the first head and thereby advances the second saddle away from the first head. This first saddle moving means is spaced apart from the second saddle moving means along the chain and is arranged relatively to the first means and the second means so that it engages only the first means when the chain conveys the second head away from the first head. Likewise, the second saddle moving means is arranged relative to the first means and the second means so that it engages only the second means when the chain conveys the second head away from the first head.

In engagement with the chain is a sprocket and disposed adjacent the sprocket is a lock which has a member movable into and out of engagement with the sprocket so that engagement of the sprocket by the member effects a lock upon the chain and the second head during hydraulic pressurizing the pipe. Preferably, the lock is a hydraulic one and includes a spider positioned adjacent the sprocket and connected to a hydraulic lock cylinder. The spider mounts a movable pin which is located for engagement with and disengagement from the sprocket.

In the accompanying drawings we have shown a preferred embodiment of our invention in which:

FIGURE 4 is an enlarged section view along the line IV—IV of FIGURE 1;

FIGURE 5 is a view along the line V—V of FIGURE 4 with some parts omitted;

Figure 1:
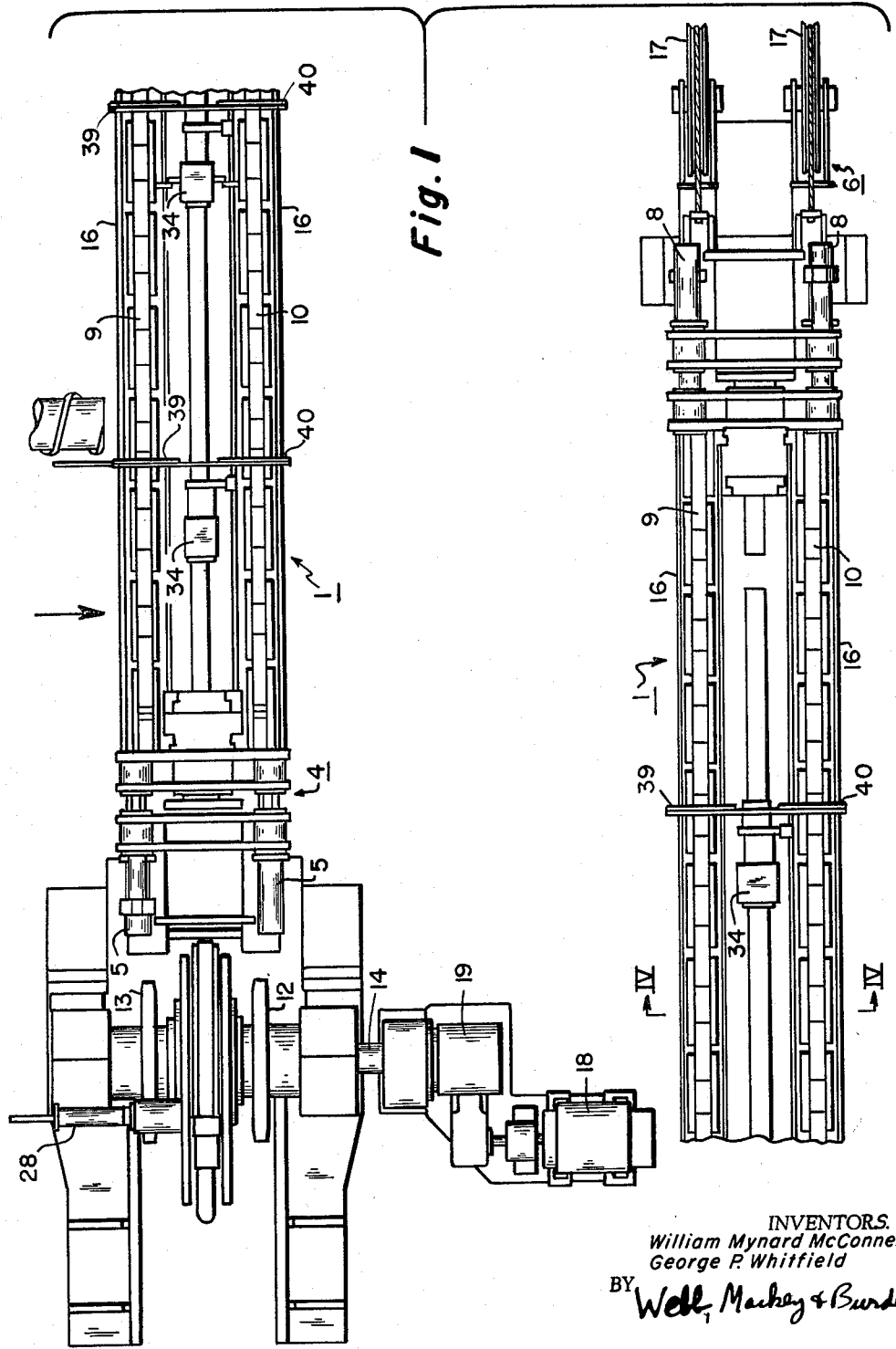
FIGURE 1 is a plan view of pipe testing apparatus which includes our invention.
Figure 2:
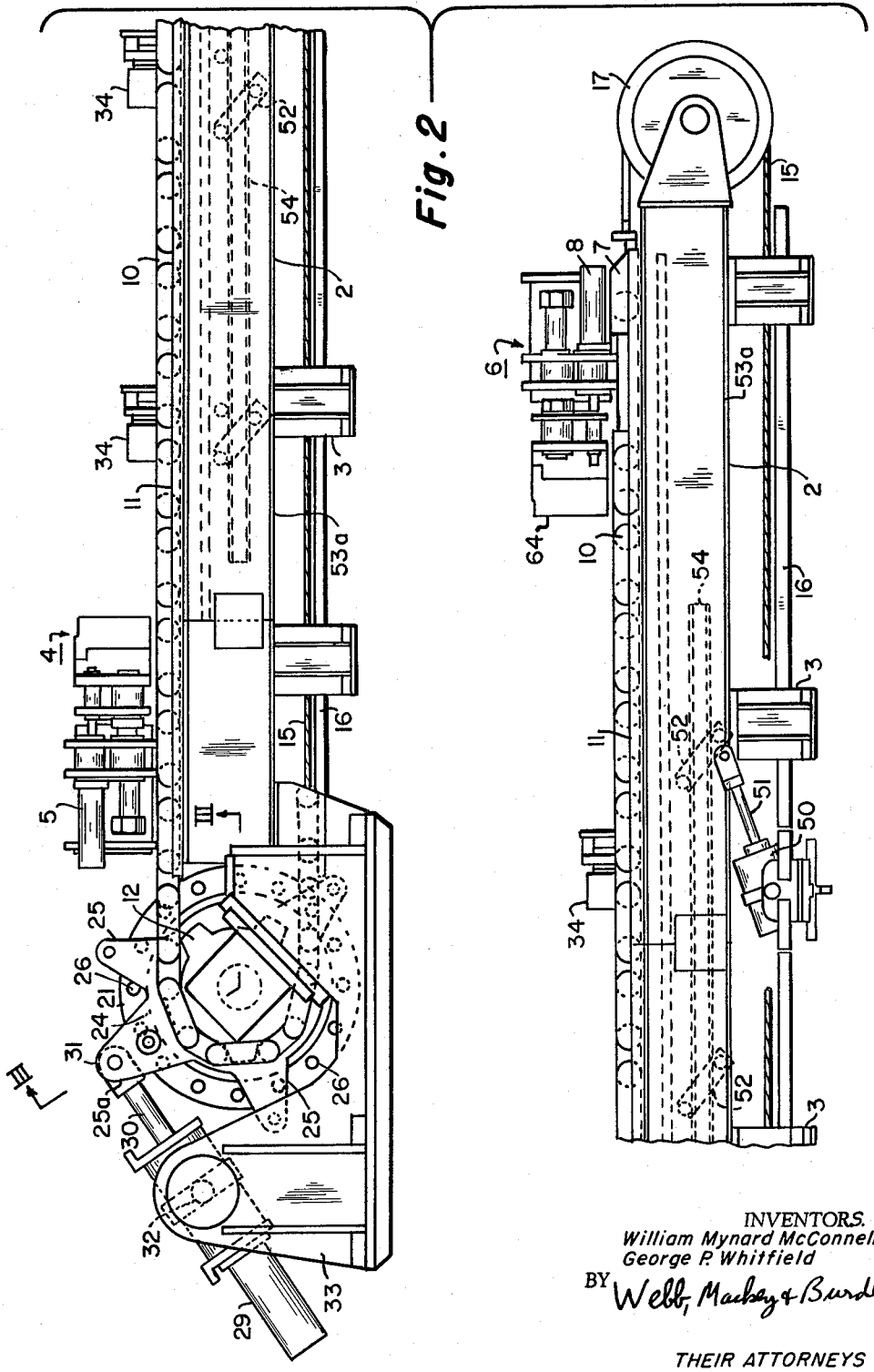
FIGURE 2 is a side elevation view of the apparatus of FIGURE 1.

Referring to FIGURES 1 and 2, we have shown our invention applied to a pipe test machine 1 comprising a horizontal frame 2 mounted upon a plurality of vertical posts 3. Adjacent one end of the frame and affixed thereto is a first head 4 for sealingly engaging one end of pipe and including set-out and pull-back cylinders 5. This head is the fill-end of the machine and has conventional piping and valves (not shown) for admitting test fluid to the pipe.

Spaced apart from the first head is a second head 6 supported by a carriage 7 which travels toward and away from the first head 4 to accommodate different lengths of pipe. This second head has set-out and pull-back cylinders 8 and piping and valves (not shown) for purging air and water from the pipe during testing same.

Figure 3:
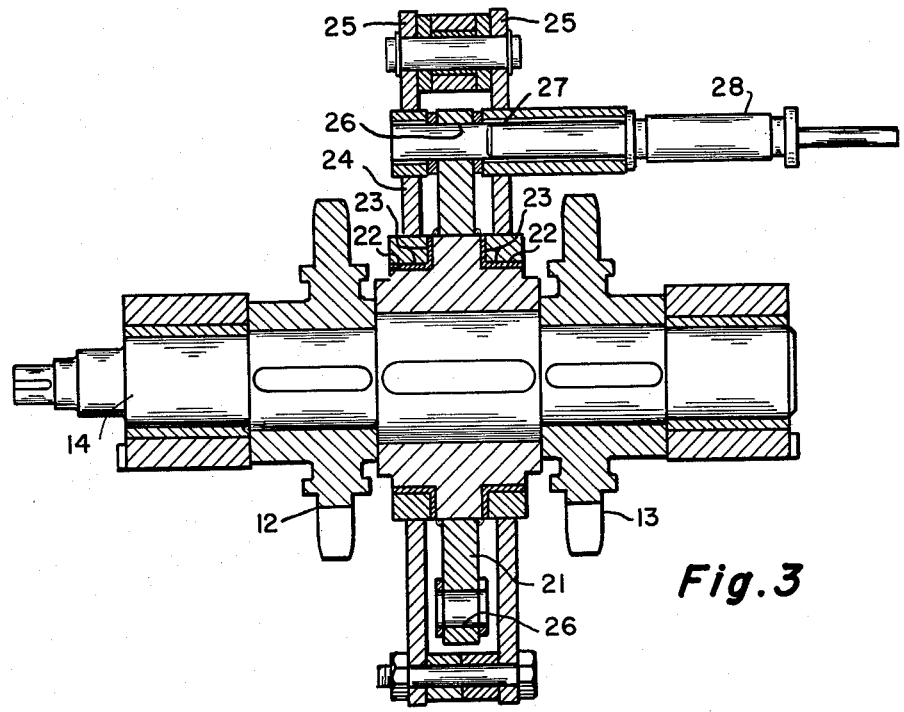
FIGURE 3 is an enlarged section view along the line III—III of FIGURE 2.

Connected to the front end of the carriage 7 are two spaced apart parallel chains 9 and 10, each of which lies and slides in a horizontal channel 11 (FIGURE 4) joined to the frame. Each chain extends past the first head 4 and into engagement with sprockets 12 and 13 which are keyed to a horizontal shaft 14 (FIGURES 1–3). With the second head at the extreme right-hand end of the frame (viewing FIGURE 2), the chain extends around the sprockets to a position beneath the first head where they are joined to two parallel cables 15 (one shown in FIGURE 2) which run the length of the frame beneath the chains 9 and 10 in guide channels 16 and around pulleys 17 at the right end of the frame to a connection with the rear part of the second head 6. An electric motor 18 and gear reducer 19 connected to the shaft 14 drive the sprockets for effecting travel of the carriage 7 and its head 6 towards the fixed head when short pipe is to be tested and away from the fixed head for long pipe. In its travel along the frame, the carriage slides over ways 20 (FIGURE 4) which are connected to and extend longitudinally of the frame.

Intermediate the two sprockets 12 and 13 is a disk 21 keyed to the shaft 14 and rotatably mounted upon shoulders 22 of the disk 21 and on bearings 23 carried thereby is a spider 24 (FIGURE 3). A plurality of spokes or arms 25 is a part of the spider and these arms straddle the disk as shown in FIGURE 3. Spaced apart and around and at an outer part of the disk is a plurality of holes 26 which receive a lock pin 27 carried by the spider and movable into and out of a hole of the disk by a cylinder motor 28 also carried by the spider.

A hydraulic lock cylinder 29 (FIGURE 2) has its piston rod 30 connected to an outer end 31 of the spoke 25a for rotating the spider 24 about the disk 21 to effect alignment of the pin 27 with a hole 26 of the disk so that the pin can enter the hole to provide a hydraulic lock of the sprockets 12 and 13, shaft 14, chains 9 and 10, carriage 7, and thereby the movable head 6. The hydraulic lock cylinder 29 has a trunnion mounting 32 upon a stand 33 affixed to the frame so that the cylinder may pivot as it rotates the spider to effect entry of the pin into a hole of the disk.

As shown in FIGURES 1 and 2, between the heads 4 and 6 is a plurality of saddles 34 of the permanent magnet type for supporting and clamping the pipe intermediately its ends during testing. Each saddle has a V-shaped pipe support surface 35 (FIGURE 4) and includes a permanent magnet (not shown) for firmly clamping the pipe thereupon throughout the test period. A car 36 mounts each saddle and rolls upon its wheels 37 along the frame between the two heads over the two parallel ways 20 affixed to the frame. Connected to each car at each side is a hold-down gib 38 which extends underneath the ways to prevent the saddles 34 and their cars 36 from being lifted up off the frame during kick-out of a pipe from the machine or during a test period.

Joined to each car and extending laterally therefrom is an entry skid 39 for delivery of pipe onto the saddles and an exit skid 40 for conveyance of the pipe from the machine after kick-off from the saddles. As shown in FIGURE 4, both the entry and exit skids overhang the chains and have a slot opening 41 through which the chains travel along the frame.

Figure 6:
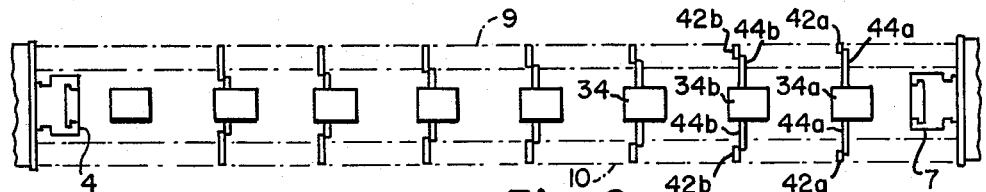
FIGURE 6 is a schematic diagram of a saddle positioning combination for the saddles of the apparatus of FIGURE 1.

As the head 6 moves away from the fixed head 4 to receive a longer pipe than that for which the heads have been positioned, the chains position some of the saddles along the frame by carrying some of the cars away from the fixed head so that the pipe is adequately supported and clamped along its span between the two heads. Spaced apart along the chains and connected thereto on both sides thereof is a plurality of saddle moving arms 42 which project laterally therefrom and towards the central longitudinal axis of the machine. FIGURE 6 shows that the saddle moving arms 42a which are furthest from the fixed head are the shortest and that the arms of each successive pair are longer than the preceding ones, viewing FIGURE 6, advancing towards the fixed head from right to left. Connected to depending segments 43 of each entry and exit skid is a saddle arm 44 which extends toward and has a part which lies in the same horizontal plane as the saddle moving arms. As shown in FIGURE 4, the depending segments 43 of the entry and exit skids straddle the chains and each carries a saddle arm 44. The saddle arms 44a mounted by the car 34a furthest from the fixed head 4 are the longest and the arms of each successive pair are shorter than the preceding ones, viewing FIGURE 6, and advancing towards the fixed head 4 from right to left.

Thus, the length of the saddle moving arms 42a relative to the saddle arms 44a of car 34a and to the other saddle arms of all the other cars is such that they are only sufficiently long to engage the saddle arms 44a as the chains travel from left to right, viewing FIGURES 1, 2 and 6, to advance the head 6 away from the fixed head 4 and they are too short to engage any other saddle arms. Likewise, the length of the next saddle moving arms 42b towards the fixed head 4 relative to the saddle arms 44b of the next car 34b towards the fixed head 4 and to all of the other saddle arms of all the other cars closer to the fixed head 4 than car 34b is such that they are only sufficiently long to engage the saddle arms 44b of the car 34b and are too short to engage any other saddle arms of the cars closer to the fixed head than the saddle arms of the car 34b. Correspondingly, the lengths of the other saddle moving arms relative to the lengths of the saddle arms of the other cars are similarly arranged so that any pair of saddle moving arms will engage only the saddle arms of its car and are too short to engage the saddle arms of all other cars closer to the fixed head 4 than its car.

Each saddle moving arm has sufficient length so that engagement with its saddle arm effects travel of the car mounting its saddle along the ways 20 away from the fixed head 4 as the chain slides along the channels to carry the movable head 6 away from the fixed one. Additionally, each saddle moving arm is so located on the chain that upon engagement with its saddle, it is positioned on the fixed head side of its saddle arm. Accordingly, when the chain slides in the opposite direction to advance the movable head towards the fixed one, the saddle moving arm has no effect upon its car or any other car. Thus, the carriage 7 contacts the car 34a as it advances towards the fixed head and pushes that car along with it and that car, in turn, contacts the next car 34b toward the movable head and pushes it along the ways as further advancement of the carriage 7 continues towards the fixed head. As a result, the chain positions the saddles along the frame when the movable head 6 travels away from the fixed head and the carriage 7 pushes these saddles towards the fixed head when it advances towards same to also locate same along the frame.

Each car 34 supports a kick-out arm 45 which has a modified V-shaped pipe engaging surface 46 and a pivot mounting 47 carried by the exit skid of each car (FIGURES 4 and 5). The kick-out arm is in tandem with the saddle of its car and is in its lowered position (shown in dotted lines, FIGURE 4) where it is below the pipe support surface 35 of the saddle 34. In its raised or kick-out position (shown in dash and dot lines, FIGURE 4), its pipe engaging surface 46 is above the saddle and a roll-out part 48 of the pipe engaging surface is above and extends past the saddle end 49 of the exit skid so that the pipe rolls off the kick-out arm onto the exit skid.

A motor cylinder 50 which is trunnion supported upon the frame raises and lowers the kick-out arms by operation of a hanger, rail and wheeled rod combination. As shown in FIGURES 4 and 5, the motor cylinder has its piston rod 51 connected to the lower end of a vertically disposed U-shaped hanger 52 which is pivotally mounted at its upper ends upon beams 53 and 53a of the frame. FIGURE 2 shows that in addition to the hanger 52, there are other identical ones spaced apart from one another and arranged in tandem and beneath the ways 20. These hangers support between their side arms a longitudinally extending rail 54 which is affixed to cross-piece 54a and, in turn, carries a plurality of vertical rods 55. Each rod 55 extends upwardly to and is connected at its top end to the kick-out arm 45 through links 56 and 57 and rotatably mounts a wheel 58 in a clevis 59 at its lower end. Joined to the arms of the clevis are downwardly extending pull-down gibs 60 which project beneath the flange 61 of the rail on both sides of the web 62 thereof.

Raising the kick-out arms results from swinging the hangers from their downwardly extending vertical position (shown in solid line, FIGURE 5) to an upwardly extending inclined position (shown in dash lines, FIGURE 5). Inasmuch as the rail is affixed to the lower part of each hanger, swinging of one hanger from its vertical position to its inclined position causes each of the other hangers to move similarly and raise the rail while maintaining it in its horizontal position. In travel from its vertical position to its inclined position, the rail travels upwardly and, in turn, raises the rods 55 which move the kick-out arms from their lowered position to their kick-out position. Then, when the motor cylinder pulls the hangers back to their vertical positions, the pull-down gibs 60 bring the rods 55 and the kickout arms 45 back to their lowered positions.

This hanger and rail combination is particularly suitable for kick-out of pipe from saddles which have permanent magnets because there is little vertical lifting of the kick-out arms as the hanger swings through a first portion of its travel from vertical position to inclined position. However, there is sufficient lifting in this first portion of travel to break the magnetic clamp upon the pipe. Then, there is a substantially greater lifting movement of the hangers after the magnetic clamp has been broken and through the latter part of this travel to the inclined position to effect the kick-out of the pipe.

Figure 7:
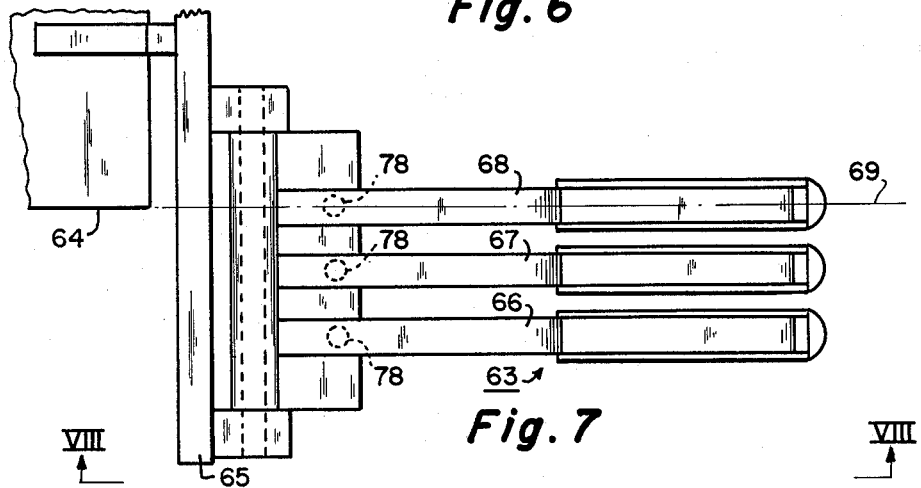
FIGURE 7 is a partial plan view of the movable head of the apparatus of FIGURE 1 showing a probe combination for locating the end of the next pipe to be tested.
Figure 8:
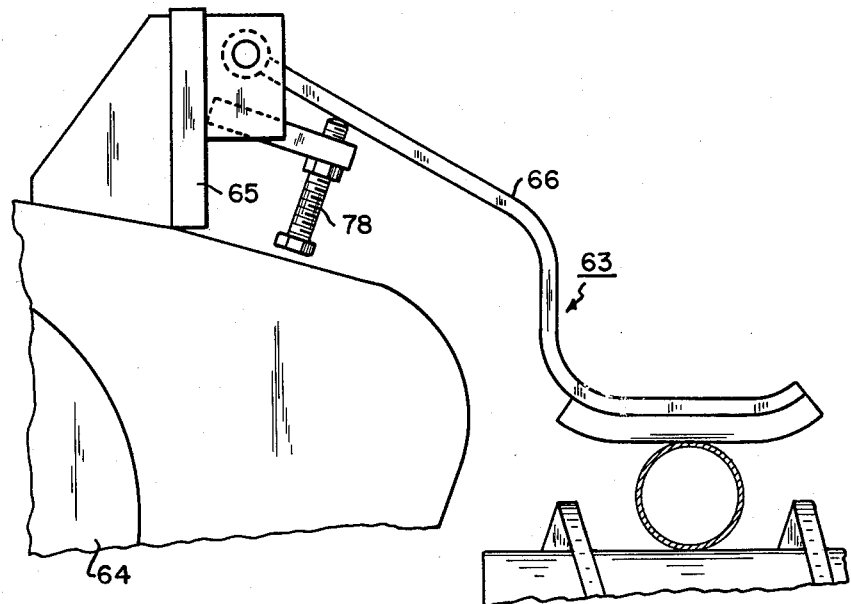
FIGURE 8 is a view along the line VIII—VIII of FIGURE 7.

To quickly and accurately position the movable head for the next pipe to be conveyed into the machine we provide a probe and signal light combination 63 (FIGURES 7 and 8). Connected to the movable head 6 and extending in advance of the front face 64 thereof towards the fixed head is a bracket 65 which mounts a first probe 66, a second probe 67 and a third probe 68, each spaced apart from the other and on that side of the head from which the next pipe is conveyed into the machine. The center line 69 of the third probe is located in alignment with the face 64 of the test head 6 in its back position and the second probe 67 is rearwardly of the plane of the face 64 of the head in its set-out position and located so that contact of one end of the pipe by it and by the first probe but not by the third probe 68 effects proper sealing of the end by the head 6 when set-out. The first probe 66 is in advance of the second probe 67 towards the fixed head.

Figure 9:
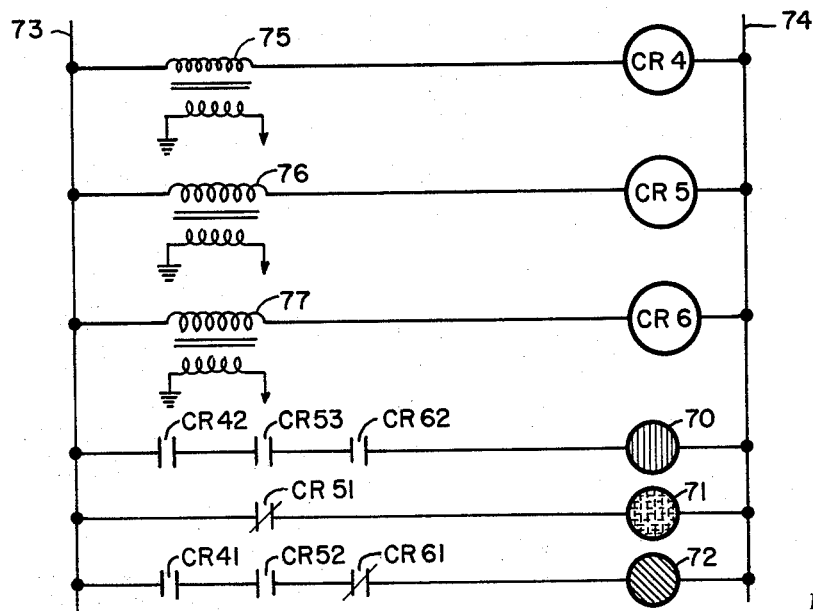
FIGURE 9 is a schematic wiring diagram for the probes of FIGURES 7 and 8 and a signal light arrangement in circuit therewith.

The three probes are in an electrical circuit with three signal lights, one red 70, one amber 71, and one green 72 (FIGURE 9) which, when illuminated, indicate the position of the front face of the movable head relative to the adjacent end of the next pipe to be tested. These lights are in a position readily visible to an operator of the machine. When only the first probe 66 contacts the next pipe, the amber light is on indicating that the next pipe is too short for the present location of the movable head. When the first and second probes both contact the pipe and the third probe does not, the green light illuminates to indicate that the head is in proper position for testing the next pipe. When all three probes contact the pipe, the red light is on, thereby indicating that the next pipe is too long for the present location of the movable head. FIGURE 9 shows diagrammatically one electrical circuit which operates as described above wherein there is an electrical interlock which illuminates only one light of the three lights for the above three described conditions.

Referring to FIGURE 9, power lines 73 and 74 are in circuit with an electrical power source (not shown) and probes 66, 67 and 68 are each part of low-voltage transformers 75, 76 and 77, respectively. The next pipe on the entry skid is grounded through the machine so that contact of the pipe only by the first probe 66 places in circuit both lines 73 and 74, transformer 75 and relay CR4 to illuminate the amber light and thereby indicate that the next pipe is too short. In this condition, the second and third probes are out of contact with the pipe.

Contact of the next pipe by the first and second probes 66 and 67 places in electrical circuit transformers 75 and 76 and relays CR4 and CR5, thereby opening normally closed contact CR51 in the circuit of the amber light to prevent illumination thereof. Simultaneously, contacts CR41 and CR52 in the circuit of the green light are closed to illuminate same and thereby indicate that the next pipe is properly positioned for entry into the machine.

Contact of the next pipe by all three probes places in electrical circuit the three transformers and relays CR4, CR5 and CR6, thereby opening normally closed contact CR51 in the circuit of the amber light to prevent its illumination and opening the normally closed contact CR61 in the circuit of the green light to prevent its illumination. Simultaneously, the three contacts CR42, CR53 and CR62 in the circuit of the red light are closed to illuminate it and thus indicate that the next pipe is too long for delivery into the machine.

The operator uses controls on his panel (not shown) to position the movable head until the green light is on.

As shown in FIGURES 7 and 8, each of the probes is hingedly mounted to the bracket 65 and is adjustable vertically by a set screw 78 also attached to the bracket. The probes are located so that they engage the next pipe to be tested along its top surface.

In addition to the saddle positioning arrangement of FIGURES 4 and 6, a second arrangement comprises each saddle moving arm and its saddle arm or pairs or groups thereof for a particular car having substantially the same length as the other saddle moving arms and saddle arms. In this second arrangement each saddle moving arm and its saddle arm or pairs or groups thereof for a particular car are located at a different vertical level from those arms of the other cars so that a given saddle moving arm engages only its saddle arm when the chain conveys the carriage away from the fixed head 4.

Our invention has important advantages which include ability to minimize the amount an end of a pipe is sealed by a movable head, thereby effecting testing of maximum lengths of each pipe. This is achieved by elimination of the conventional rack and lock devices on the frame and location of the lock for the chain and the movable head on the sprocket drive to provide infinite adjustments of the movable head for different lengths of pipe. Accordingly, the set out stroke of the movable head need not be sufficiently long to take into account the pitch between two successive teeth of a rack or two successive holes of a lock device. Thus, both test heads can have the same amount of set-out stroke and the movable head can be smaller, lighter and more compact than heretofore. Also, use of the probes located as described herein in combination with the signal lights permits quick positioning of the movable head for the next pipe to be tested.

Another advantage of our invention is ability to quickly test a number of successive pipe of different lengths by driving the sprockets to position the carriage for each different length. This ability follows from elimination of the rack and lock devices whereby the carriage can be readily repositioned without seeking the correct rack notch or hole for locking the carriage for each different length of pipe.

Use of the hydraulic lock in combination with the sprocket drive and of the spider whereby the piston rod of the hydraulic lock is joined to the outer end of one spoke of the spider affords a mechanical advantage and enables one to use a smaller hydraulic lock for the same testing or expanding pressures than is the case for those machines which have the hydraulic lock connected to one of the heads.

A further advantage is a simple rugged and relatively low-cost saddle positioning device which is due to the saddle moving arms and saddle arms arranged so that one saddle moving arm engages only its saddle arm and no others to position its saddle as the movable head travels away from the fixed one. Then, repositioning of the saddles for short pipe follows from the movable head pushing the saddles towards the fixed head.

While we have shown and described a preferred embodiment of our invention, it is to be understood that it may be otherwise embodied within the scope of the following claims.

We claim:

1. In apparatus for subjecting pipe to internal hydraulic pressure, said apparatus having a frame and a first head for sealingly engaging one end of a pipe, the invention comprising a chain disposed on said frame and extending longitudinally thereof for movement therealong, a second head for sealingly engaging the other end of said pipe and being connected to said chain and movable therewith toward and away from said first head, said chain being adapted to be drivingly connected to motor means for moving it along said frame to cause said second head to travel a path towards and away from said first head, at least one saddle having a mounting which permits travel upon said frame intermediate of said two heads for supporting said pipe between its ends, said mounting being such that engagement of said saddle by said second head upon travel towards said first head advances said saddle towards said first head, means connected to said saddle and positioned to engage a saddle moving means joined to said chain and advance said saddle away from said first head when said chain moves along said frame to convey said second head away from said first head, sprocket means in engagement with said chain, lock means disposed adjacent said sprocket means and having a member movable into and out of engagement with said sprocket means, engagement of said sprocket means by said member effecting a lock upon said chain and said movable head to prevent travel of said movable head toward and away from said first head.

2. The invention of claim 1 characterized by said lock means being hydraulic and including a spider positioned adjacent said sprocket means and being connected to a hydraulic lock cylinder, a movable pin mounted by said spider and disposed for engagement with said sprocket means and disengagement therefrom.

3. The invention of claim 2 characterized by said sprocket means being keyed to a shaft, said spider being rotatably mounted upon said shaft, said sprocket means having a plurality of spaced apart holes positioned for receiving said pin, said spider having an arm extending radially from a central part thereof and having its connection to said hydraulic lock cylinder adjacent an outer part of said arm.

4. In apparatus for subjecting pipe to internal hydraulic pressure, said apparatus having a frame and a first head for sealingly engaging one end of a pipe, the invention comprising a chain disposed on said frame and extending longitudinally thereof for movement therealong, a second head for sealingly engaging the other end of said pipe and being connected to said chain and movable therewith toward and away from said first head, said chain being adapted to be drivingly connected to motor means for moving its along said frame to cause said second head to travel a path towards and away from said first head, at least first and second saddles having mountings which permit travel upon said frame intermediate said two heads for supporting said pipe between its ends, said mountings being such that engagement of one of said saddles by one of said second head and said other saddle upon travel of said second head towards said first head advances said one saddle towards said first head, first means connected to said first saddle and positioned to engage first saddle moving means joined to said chain and to advance said first saddle away from said first head when said chain moves along said frame to convey said second head away from said first head, second means connected to said second saddle and positioned to engage second saddle moving means joined to said chain and to advance said second saddle away from said first head when said chain conveys said second head away from said first head, said first saddle moving means being spaced apart from said second saddle moving means along said chain and arranged relative to said first means and said second means that it engages only said first means when said chain conveys said second head away from said first head, said second saddle moving means being arranged relative to said first means and said second means that it engages only said second means when said chain conveys said second head away from said first head.

5. The invention of claim 4 characterized by sprocket means in engagement with said chain, lock means disposed adjacent said sprocket means and having a member movable into and out of engagement with said sprocket means, engagement of said sprocket means by said member effecting a lock upon said chain and said movable head to prevent travel of said movable head toward and away from said first head.

6. The invention of claim 5 characterized by said lock means being hydraulic and including a spider positioned adjacent said sprocket means and being connected to a hydraulic lock cylinder, a movable pin mounted by said spider and disposed for engagement with said sprocket means and disengagement therefrom.

7. The invention of claim 6 characterized by said sprocket means being keyed to a shaft, said spider being rotatably mounted upon said shaft, said sprocket means having a plurality of spaced apart holes positioned for receiving said pin, said spider having an arm extending radially from a central part thereof and having its connection to said hydraulic lock cylinder adjacent an outer part of said arm.

8. The invention of claim 4 characterized by said first saddle being located between said second head and said second saddle and by said first and second means and said first and second saddle moving means being arms, said first arm being longer than said second arm and said first saddle moving arm being shorter than said second saddle moving arm, the length of said second arm relative to said first saddle moving arm being such that there is a space therebetween when they are opposite one another so that said first saddle moving arm escapes engagement with said second arm.

9. The invention of claim 4 characterized by said two saddles each carrying a pipe kick-out member which is operable from a first position where it is out of engagement with said pipe to a second position where it engages said pipe and conveys same away from said apparatus, said kick-out member including a means in engagement with a longitudinally disposed bar supported by at least two spaced apart substantially vertically positioned hanger members pivotally mounted at an upper position upon said frame, said bar being located beneath said chain, at least one of said hanger members being adapted to be connected to a motor means for pivoting said hangers about their pivot mountings to raise said bar and operate said kick-out members.

10. The invention of claim 9 characterized by each of said two saddles including a permanent magnet.

11. The invention of claim 6 characterized by each of said two saddles including a permanent magnet and carrying a pipe kick-out member which is operable from a first position where it is out of engagement with said pipe to a second position where it engages said pipe and conveys same away from said apparatus, said kick-out member including a means in engagement with a longitudinally disposed bar supported by at least two spaced apart substantially vertically positioned hanger members pivotally mounted at an upper position upon said frame, said bar being located beneath said chain, at least one of said hanger members being adapted to be connected to a motor means for pivoting said hangers about their pivot mountings to raise said bar and operate said kick-out members.

References Cited in the file of this patent
UNITED STATES PATENTS 2,183,974    Richardson _____ Dec. 19, 1939
2,907,202    McConnell _____ Oct. 6, 1959